United States Patent [19]

Gross

[11] 4,071,845
[45] Jan. 31, 1978

[54] HARBOR RADIO NAVIGATION SYSTEM

[75] Inventor: Fritz A. Gross, Weston, Mass.

[73] Assignee: Raytheon Company, Lexington, Mass.

[21] Appl. No.: 563,873

[22] Filed: Mar. 31, 1975

[51] Int. Cl.² .............................................. G01S 5/02
[52] U.S. Cl. .................................. 343/113 R; 325/64; 325/116
[58] Field of Search ................... 343/113 R, 102, 115; 325/55, 64, 116; 340/168 B, 171 R, 3 A

[56] References Cited

U.S. PATENT DOCUMENTS

| | | | |
|---|---|---|---|
| 2,159,159 | 5/1939 | Horle | 343/115 |
| 2,471,412 | 5/1949 | Clark | 343/115 |
| 3,366,958 | 1/1968 | Seaborn | 343/112 D |
| 3,378,817 | 4/1968 | Vitt | 325/55 |
| 3,510,777 | 5/1970 | Gordon | 325/55 |
| 3,628,150 | 12/1971 | Ditthardt | 325/55 |
| 3,689,842 | 9/1972 | Meed | 325/116 |
| 3,816,832 | 6/1974 | Elwood | 343/102 |
| 3,835,387 | 9/1974 | Rooks et al. | 325/64 |

FOREIGN PATENT DOCUMENTS 315,857  5/1930  United Kingdom ................. 343/101

OTHER PUBLICATIONS

Keen, *Wireless Direction Finding*, 3rd Edition (1938), Iliffe & Sons Ltd., London, pp. 465-467.

*Primary Examiner*—Maynard R. Wilbur
*Assistant Examiner*—T. M. Blum
*Attorney, Agent, or Firm*—John R. Inge; Milton D. Bartlett; J. D. Pannone

[57] ABSTRACT

A radio beacon navigation system wherein buoys placed at predetermined locations in a harbor or channel transmit identification signals. Every buoy is assigned a unique carrier frequency upon which is transmitted a signal capable of identifying the buoy. Each buoy is shown on harbor charts according to the unique properties of its signal. Radio receiving means carried aboard vessels navigating through the harbor or channel include means for determining the identity of the buoy from which signals are received and the direction from which the received signals emanate.

10 Claims, 8 Drawing Figures

HARBOR RADIO NAVIGATION SYSTEM

BACKGROUND OF THE INVENTION

1. Field of the Invention

The invention broadly relates to a system for guiding boats through a harbor, channel, or dangerous waters especially during periods of low visibility such as during fog or inclement weather or during the nighttime when shore markers or buoys cannot be sighted visually. More particularly, the invention relates to a radio beacon navigation system in which a vessel may determine its position from a determination of the direction at which radio signals are being transmitted in which the position of the source of radio signals has been previously charted.

2. Description of the Prior Art

Providing safe navigation for ships during periods of low visibility has been a difficult problem for many centuries. Thousands of years ago lighthouses were invented as a means for providing a visual indication to ships of a number of possible conditions. Lighthouses could either mark the entrance to a harbor or warn of many types of danger such as hidden rocks or shoals. Important as lighthouses have been in the past and still are at the present they are incapable of providing a vessel with a precise indication of its position. Furthermore, the usefulness of a lighthouse is severely limited during periods of dense fog despite the use of extremely high powered lamps which are not available. Furthermore, such lights are of little use in guiding a boat through a narrow winding channel in which the direction of the boat must be changed continually.

Many types of buoys have been in use for hundreds of years in guiding boats through harbors and other channels. A buoy in its earliest and simplest form was a floating marker anchored to the bottom of the harbor or channel. Various shapes were used depending upon what the presence of the buoy was an indication of. Various color combinations were also used. Although somewhat precise navigation was possible during periods of high visibility, such buoys were completely useless when they were hidden by darkness or obscured weather conditions.

In later days bells were attached to the buoys to give an audio indication of the presence of the buoy even when the buoy could not be seen. However, accurate navigation was not possible since it is difficult to determine the location from which such a sound is emanating. Moreover, if a large number of such buoys were employed in one harbor or channel it would be difficult to identify individual buoys as unique and identifiable audio signals are difficult to achieve using bells.

At a still later date various types of lights were attached to buoys. The lights could be flashing or of different colors. Although such lights were quite useful they consumed large amounts of power requiring constant maintenance with attendant high expense.

In modern days radio navigation systems have been developed for guiding ships both upon the high seas and through harbors and channels. In the most well known of these systems, the LORAN system, shore stations transmit identifying pulses in time sequence. The position of the ship may be computed from the difference in arrival times of pulses received from the various shore stations. This system is used primarily for determining the gross position of a vessel such as is needed for navigation upon the high seas. Also, the system requires relatively expensive receiving equipment made so by the requirement for extremely precise measurements upon the relative arrival times of the various received pulses.

Other radio direction finding systems have been developed particularly adapted for use in harbor and channel navigation. In one type of such system a plurality of shore stations continually transmit signals in phase synchronization with one another. The vessel's position is determined by comparing the phases of the received signal and determining the direction to each shore station using radio direction finding techniques. The receiving equipment required for such systems is also expensive because of the inherent difficulty in making an accurate phase measurement from two or more signals arriving within a short time period.

A second category of the system which has been developed for harbor and shore navigation employs one or more shore transmitting stations which transmit a pulse at a predetermined time. Highly accurate receiving means carried aboard the vessel measure the transit time between the shore station and ship and from that measurement determines the distance between shore station and ship. Unfortunately, this system is inordinatey expensive in that it requires the use of atomic clocks within the shipboard receiver. All of these systems are much too expensive for use aboard small vessels and pleasue craft.

SUMMARY OF THE INVENTION

Accordingly, it is an object of the invention to provide a navigation system with which a vessel may make an accurate determination of its position during darkness and during all weather conditions.

Furthermore, it is an object of the present invention to provide a navigation system employing buoys which requires little maintenance.

Moreover, it is an object of the invention to provide a navigation system in which inexpensive receiving equipment may be used aboard ship.

These as well as other objects of the invention are met by a navigation system employing a plurality of radio transmitter bearing buoys placed at predetermined locations within the harbor or channel. Each of the transmitting means within the buoys includes modulation means for modulating a signal upon the carrier signal capable of uniquely identifying the buoy. In one embodiment of the invention, two or more audio tones are transmitted upon each carrier. In a second embodiment of the invention, a digital code is transmitted by each buoy, a unique code being assigned to each buoy. Receiving means carried aboard vessels navigating through the harbor or channel includes means for demodulating the signals received from the various buoys and means for determining from which of the buoys the signals were transmitted. The identifying means may include means for determining the frequency of audio tones transmitted or, alternatively, for identifying the digital code transmitted.

In the first embodiment of the invention described above, the transmitting means includes two or more oscillators for producing modulating signals at predetermined frequencies. The modulating signals once added together are coupled to modulating means where they modulate a signal generated by a carrier signal generating oscillator. The carrier and modulation products may be removed prior to final RF amplification.

Output signals from the RF amplifier are coupled through a matching network to a transmitting antenna which is preferably an omnidirectional antenna mounted atop the buoy. Power for the transmitter may be supplied either from a battery or a wave motion operated generator.

A transmitting circuit in accordance with the second embodiment of the invention described above may also be used in each buoy. In such a transmitter, a predetermined code unique to the buoy is stored within a memory. The memory is addressed by a continuously cycling binary counter which advances one count for each clock pulse supplied by a clock pulse generator. The code is thus read out of the memory in serial fashion. The output code data bit stream from the memory is coupled to a modulator circuit which modulates the carrier signal generated by a carrier signal generating oscillator. The modulated signal is amplified and coupled to the transmitting antenna through a matching network as in the first embodiment.

Receiving means carried aboard vessels navigating the harbor or channel operate in two modes, search mode and direction finding mode. Search mode is used for finding a signal transmitted by a selected buoy. Direction finding mode is used when the signal from the selected buoy has been found and the direction to the selected buoy is being determined.

The receiving means includes directional and omnidirectional antennas and RF amplification means switchably coupled to the receiving antenna. The output of the RF amplifier is mixed with the output of a local oscillator circuit and passed through an IF stage which includes an IF filter to a detector circuit. In some embodiments of the invention, the local oscillator comprises a voltage controlled oscillator the input to which is at least partially controlled by the output voltage of a discriminator coupled to the IF stage forming an automatic frequency control loop. In the first embodiment of the invention described above, the detected signals are coupled to a plurality of audio frequency filters, one of such filters being provided for each of the audio frequency tones transmitted by any one of the buoys. The audio frequency filters are preferably adjustable filters so that an operator may adjust them to the frequencies transmitted by a selected one of the buoys. The outputs of the audio frequency filters are each coupled to an audio frequency detector. If a signal of sufficient amplitude is not present on the output of each of the audio frequency detectors and if the receiving circuit is in the search mode, the local oscillator sweeps in frequency throughout the frequency range of the carrier signals transmitted from the buoys. If a signal of sufficient amplitude is present on the output of each of the audio frequency detectors, the local oscillator is locked to the frequency of the signal then being received. Once the local oscillator has been locked, the receiving means is switched to the direction finding mode so that the direction to the buoy may be determined.

In the second embodiment of the invention described above, digital processing circuitry is used rather than the audio frequency filters and detectors described above in conjunction with the first embodiment of the invention. There the code corresponding to the designated buoy is compared with the stream of binary bits being received. A positive comparison halts the sweeping of the local oscillator signal.

DESCRIPTION OF THE PREFERRED EMBODIMENTS

Figure 1:
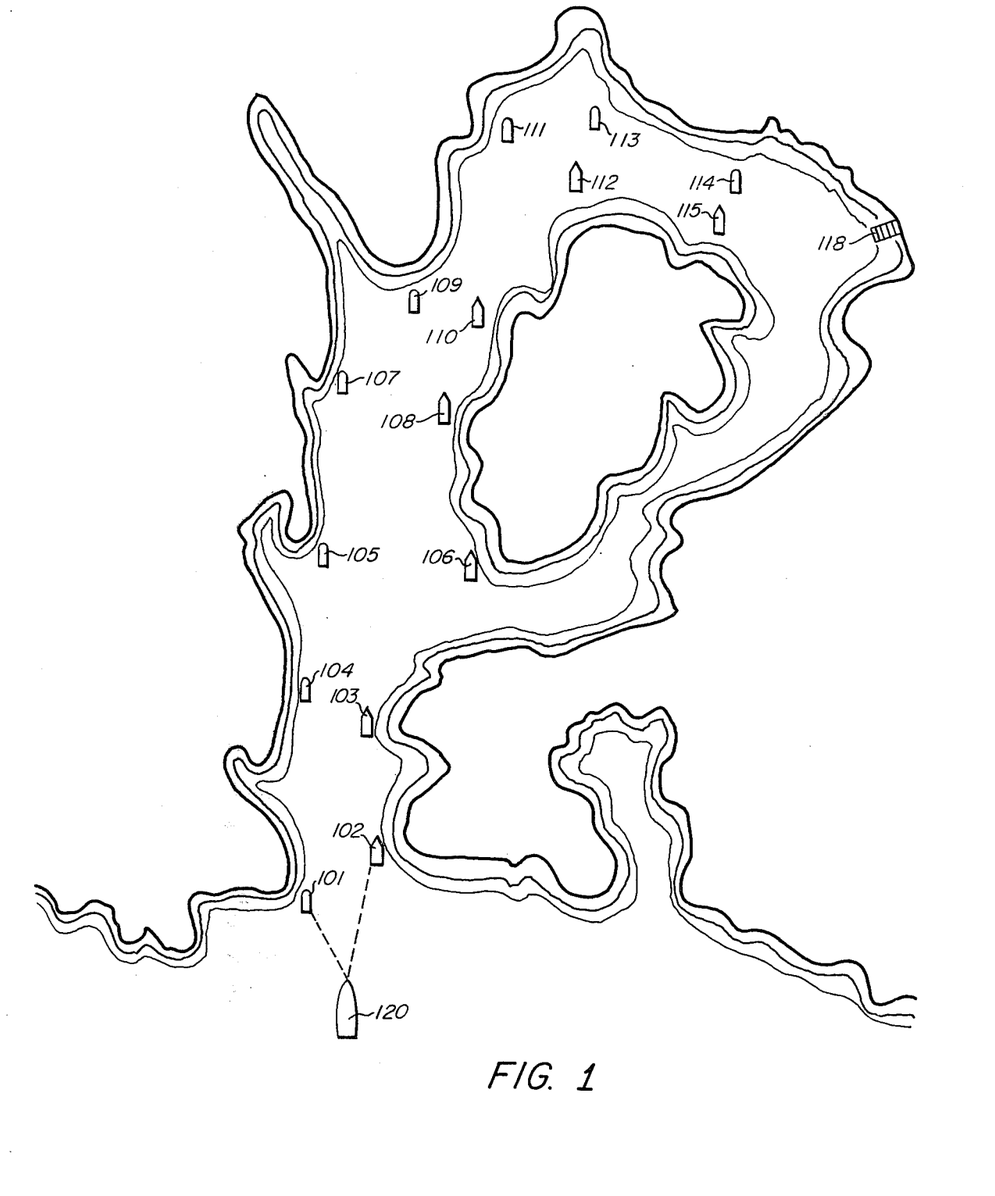
FIG. 1 is a perspective view showing a harbor and channel in which the present invention is used to advantage.

FIG. 1 shows a perspective view of a harbor having a narrow channel with difficult passage in which the invention is of particular advantage. A vessel 120 entering the harbor wishes to navigate through the channel to boat dock 118. Buoys 101–115 are spaced through the harbor on both sides of the channel. The positions at which the buoys are placed preferably include the entrance to the harbor, turns in the channel, and hazardous underwater formations such as rocks and shoals. The location of each buoy is specified upon charts carried aboard vessel 120.

In accordance with the invention, each buoy 101–115 is equipped with a radio transmitter. Also in accordance with the invention, each buoy is uniquely identifiable by the signal produced by its radio transmitter. The properties of the signals from each buoy which permits it to be identified are also included upon the charts carried by vessels 120.

As vessel 120 enters the harbor its receiver is tuned to the signals from the transmitter in buoy 101. Once it has been verified that the signal is indeed from buoy 101 the receiver is locked to the frequency of signal and the direction from vessel 120 to buoy 101 is determined using direction finding techniques. Once the direction to buoy 101 has been determined, the direction to buoy 102 is determined in the same fashion. The position of vessel 120 may then be computed by triangulation. Vessel 120 then proceeds through the harbor channel tuning its receiver to each of the buoys in succession thereby continually being able to determine its position within the channel.

Two embodiments for practicing the invention are described herein below. In the first embodiment, each buoy transmitter operates upon a unique predetermined carrier frequency. Upon each carrier are modulated two or more audio tones the combination of which also uniquely identifies the buoy. No two buoys are assigned the same set of audio modulating tones. In a second embodiment of the invention, each buoy is again assigned a unique predetermined carrier frequency. The carrier signal of each buoy in the second embodiment is modulated with a unique digital code different from the code transmitted by all other buoys within the system. Appropriate transmitting and receiving means are provided in each case.

Figure 5:
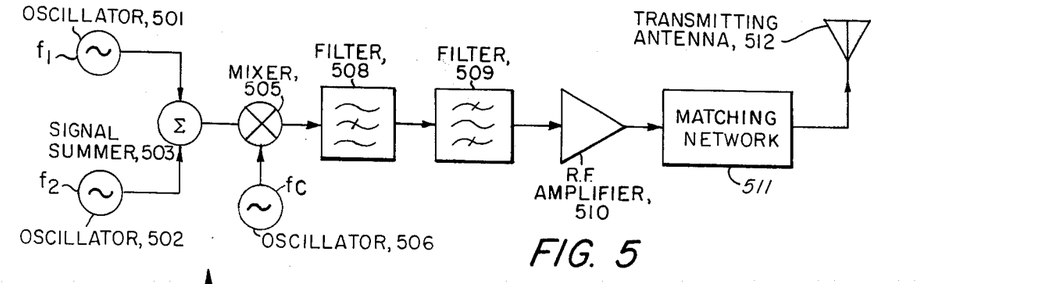
FIG. 5 is a block schematic diagram of a transmitter circuit in accordance with the first embodiment of the invention.
Figure 6:
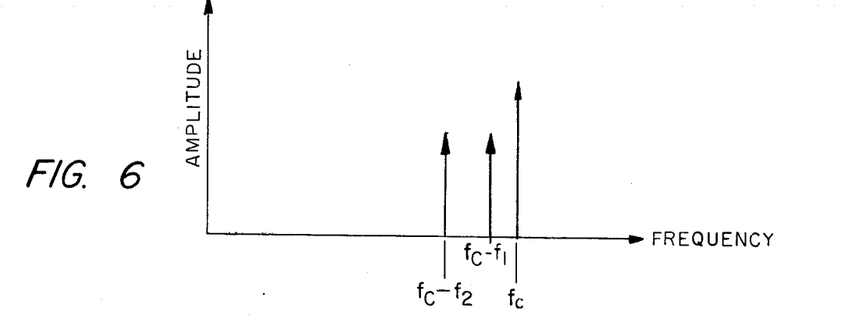
FIG. 6 is a diagram showing the frequency spectrum of the transmitter of FIG. 5.

Referring next to FIG. 5 there is shown a block schematic diagram of a transmitter circuit for use with the first embodiment of the direction. Oscillators 501 and 502 produce sine wave signals at frequencies $f_1$ and $f_2$. These are summed by signal summer 503 and coupled to mixer 505. The sine wave carrier signal produced by oscillator 506 is therein mixed with the audio tones producing an amplitude modulated signal. At the output of mixer 505 the signal has five frequency components: the carrier frequency $f_o$, $f_c+f_1$, $f_c-f_1$, $f_c+f_2$, and $f_c-f_2$. As two of the noncarrier terms contain redundant information they may be removed to thereby permit the available power to be concentrated within a smaller spectrum of frequencies. Serially connected filters 508 and 509 perform this function. The resulting spectrum is shown in FIG. 6 wherein the components $f_c+f_1$ and $f_c+f_2$ have been removed. The available power is thereby concentrated in the components $f_c-f_1$, $f_c-f_2$, and the carrier $f_c$. Of course the components $f_c-f_1$ and $f_c-f_2$ could have been the two components removed with equal effectiveness.

The filtered signals are boosted in amplitude by RF amplifier 510 the output of which is coupled through matching network 511 to transmitting antenna 512. Transmitting antenna 512 is preferably an omnidirectional antenna mounted atop the buoy although other antenna types including directional antennas may be used as well. The transmitter may be powered either by a battery or set of batteries contained within the buoy or by a small generator which is operated by wave motion. A combination of batteries and a generator may also be used. It has been found that with the invention sufficiently low power may be used that the batteries need be changed only approximately once every year. The object of the invention as to the infrequency of maintenance is thereby achieved. The exact frequency of operation of the system is not critical. However, the frequency should be sufficiently high that the size of transmitting and receiving antennas is manageably small. For this purpose, frequencies in the VHF and UHF ranges are preferred.

Figure 7:
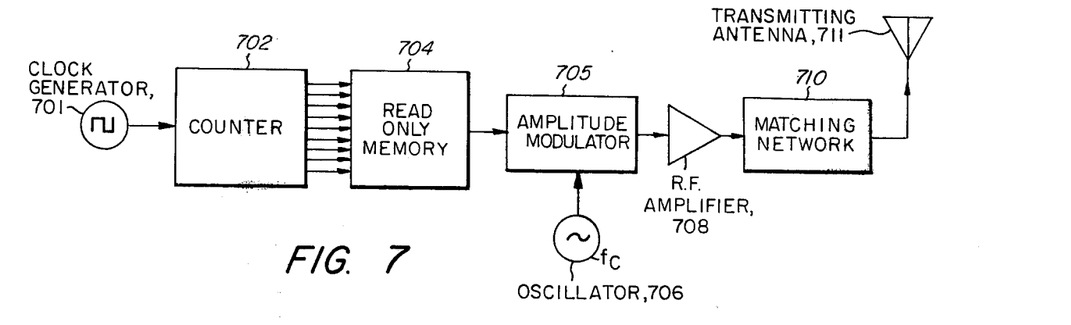
FIG. 7 is a block schematic diagram of a transmitter circuit in accordance with the second embodiment of the invention.

In FIG. 7 is shown a block schematic diagram of a transmitter circuit used in the second embodiment of the invention. A unique binary code consisting of a sequence of binary numbers or bits which uniquely identify the buoy containing the transmitter is stored within read only memory 704. There is a correspondng address within read only memory 704 corresponding to each of the binary bits. The binary bits of the code are read out of read only memory 704 serially in sequence by addressing read only memory 704 with a continuously cycling ordered count from counter 702. Clock pulses supplied by clock generator 701 cause counter 702 to sequentially step through the count sequence.

The serial stream of binary data bits from read only memory 704 amplitude modulates the sine wave carrier signal generated by oscillator 706 within amplitude modulator 705. The modulated signal is boosted in power by RF amplifier 708 the output of which is coupled through network 710 to transmitting antenna 711. Power for this circuit may be supplied in the same manner as for the transmitter circuit shown in FIG. 5.

Figure 2:
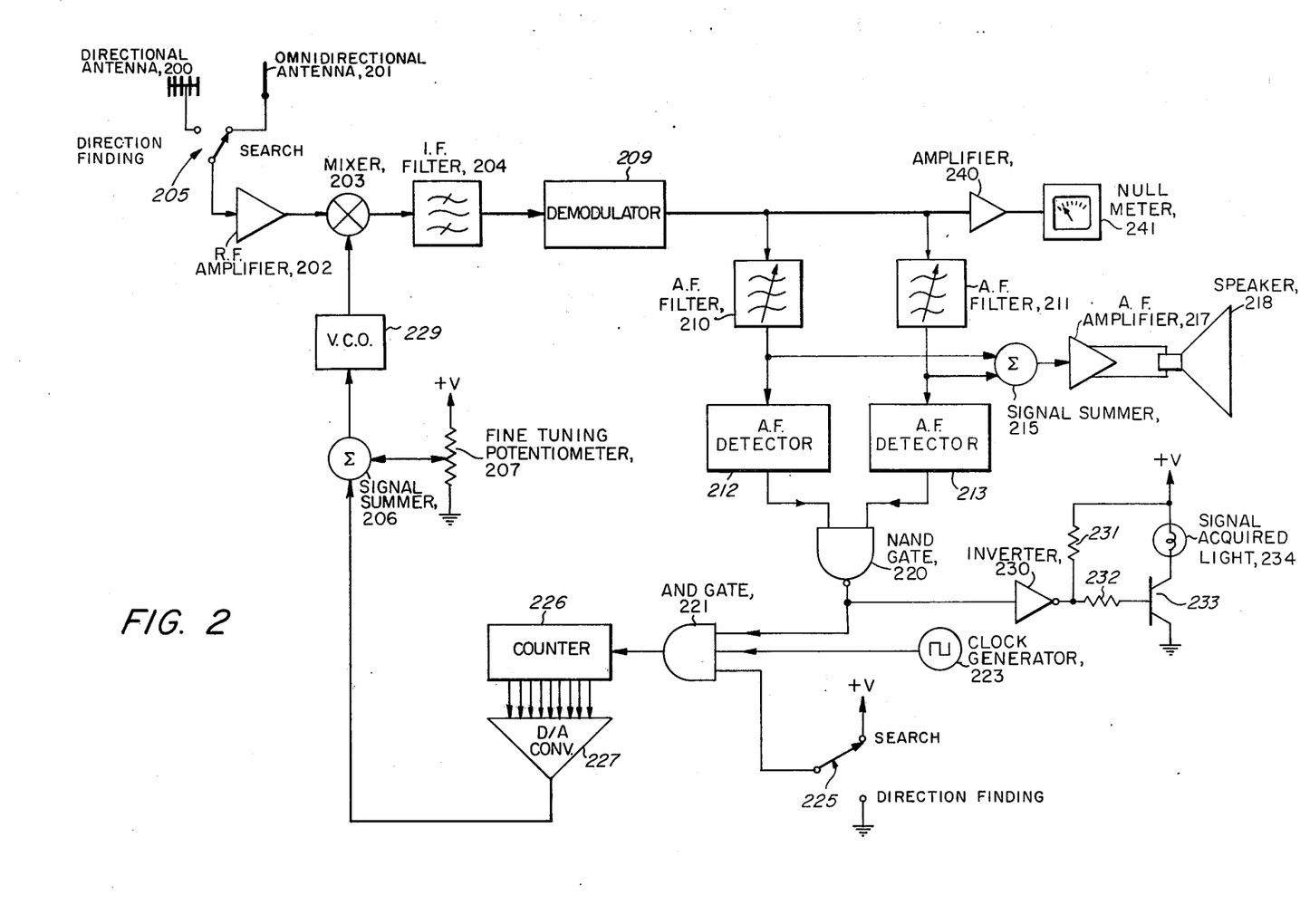
FIG. 2 is a block schematic diagram of a receiver in accordance with one embodiment of the invention.

In FIG. 2 is shown a block diagram of a receiver circuit used with the first embodiment of the invention. The receiver has two modes of operation: search mode and direction finding mode. In the search mode of operation the receiver scans the bandwidth allocated to the navigation system searching for a signal transmitted from a particular buoy. In the direction finding mode of operation, which is used after the signal from the designated buoy has been identified, the direction to the buoy is determined.

In the search mode of operation switches 205 and 225 are set to the position shown in the drawing. Omnidirectional antenna 201 is then coupled to the input of RF amplifier 202. Omnidirectional antenna 201 is preferably a whip antenna which receives signals equally well from all directions. The RF amplified signals are mixed with the sine wave output from voltage controlled oscillator 229 by mixer 203 lowering the frequency of the incoming signal to an intermediate or IF value. The IF signal from mixer 203 is passed through IF filter which eliminates signals and noise outside the bandwidth of interest. An additional filter or amplifier may if desired, be coupled in series with IF filter 204. The output of IF filter 204 is passed to amplitude modulation detector 209 which removes the carrier signal leaving only the audio frequency tone signals.

The demodulated audio frequency signals are coupled to the inputs of both audio frequency filters 210 and 211 which are adjustable filters. Before commencing the search operation audio frequency filters 210 and 211 are adjusted to the audio frequencies transmitted by the selected buoy. The outputs of filters 210 and 211 are coupled respectively to audio frequency detectors 212 and 213. When no signal is present at the input of one of these detectors or if the signal present is below a predetermined level, no output signal will be present at the output of the detector. Once an appropriate audio frequency signal is present which is above the predetermined level a constant DC voltage appears on the output.

If no signal is present on either of the outputs of audio frequency detectors 212 and 213 the output of logical NAND gate 220 will be in the logical 1 state represented by a DC voltage of $+V$. This voltage is coupled to one input of AND gate 221. Moreover, when the receiver is in the search mode of operation, switch 225 couples a voltage of $+V$ to a second one of the inputs of AND gate 221. With these two inputs in the logical 1 state, AND gate 221 permits the signal produced by clock generator 223 to be coupled to the clock input of counter 226.

Counter 226 is a continuously cycling binary counter which advances one count for each clock pulse received at its clock input. When counter 226 reaches its highest attainable count it recycles to zero upon the next clock pulse.

The count output of counter 226 is coupled to the input lines of digital/analog converter 227. Digital/analog converter 227 converts the binary count to an analog voltage which, coupled through signal summer 206, controls the output frequency from voltage controlled oscillator 229.

Figure 3:
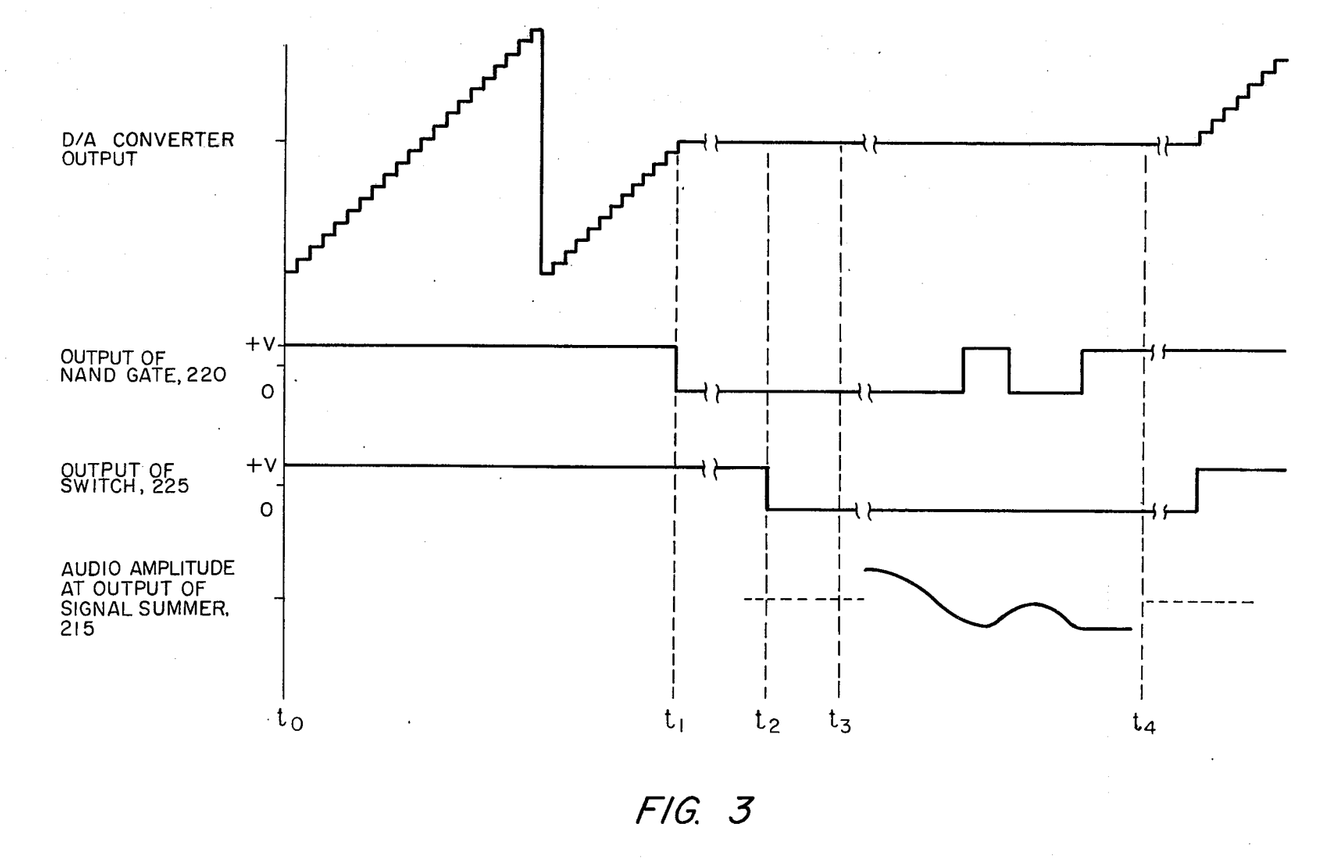
FIG. 3 is a series of waveforms useful in explaining the operation of receiving circuits in accordance with the invention.

The output signal from digital/analog converter 227 during the search mode of operation is shown in FIG. 3 during the time period $t_0$ to $t_1$. The output voltage range of digital/analog converter 227 is fixed such that voltage controlled oscillator sweeps from one end of the allocated bandwidth to the other during search operation.

When a signal from the designated buoy has been received a voltage will be present on the outputs of audio frequency detectors 212 and 213 corresponding to the logical 1 state. The presence of two signals in the logical 1 state at the inputs of NAND gate 220 causes the output of the NAND gate output to assume the logical 0 state. The logical 0 on one input of AND gate 221 causes its output to remain in the logical 0 state thereby shutting off clock pulses to the clock input of counter 226. With no clock pulses present counter 226 stops counting and remains in the state corresponding to the frequency of the then received signal from the designated buoy.

The output of NAND gate 220 also operates signal acquired light 234. When the desired signal is not present and a logical 1 is present on the NAND gate output, a logical 0 signal is present on the output of inverter 230. The logical 0, corresponding to a ground condition, prohibits current from flowing from resistor 231 through resistor 232 to the base of transistor 233 turning the transistor off and thereby prohibiting current flow through signal acquired light 234. With the desired signal present, the output of NAND gate 220 is in the logical 0 state and the output of inverter 230 in the logical 1 state. Current is then allowed to flow into the base of transistor 233 turning it and signal acquired light 234 on.

When a signal from a designated buoy has been identified and locked in by halting the cycling of counter 226, signal acquired light 234 is lit and the receiver is manually switched to the direction finding mode by changing the positions of switches 205 and 225. Preferably, switches 205 and 225 are mechanically ganged together. Directional antenna 200 is then coupled to the input of RF amplifier 202. Switch 225 grounds one of the inputs to AND gate 221 to prevent any clock pulses from reaching counter 226 during the direction finding operation.

Fine tuning to maximize the received signal is provided by fine tuning potentiometer 207. The output of fine tuning potentiometer 207 is summed with the output of D/A converter 227 by signal summer 206 to set the total voltage to voltage controlled oscillator 229.

The direction to the designated buoy is determined by rotating directional antenna 200 until a null in the amplitude of the received signal strength is located. The designated body is then located perpendicular to the preferred axis of directional antenna 200.

In the preferred embodiment shown in FIG. 2 an audio signal is developed which is indicative of the strength of the received signal and hence useful in finding the null direction of directional antenna 200. The outputs of audio frequency filters 210 and 211 are added together linearly by signal summer 215. The resulting signal is then amplified by audio frequency amplifier 217 the outputs of which are connected to loud speaker 218.

A second indication of the strength of received signals is provided by null meter 241. Amplifier 240 steps up the level of the detected signals on the output of detector 209 to the level required by null meter 241. A gain adjustment may be provided to increase the accuracy of the direction finding operation at low signal levels.

Referring again to FIG. 3 the operation of the receiver will be further explained in conjunction with the waveform shown therein. From time $t_0$ to $t_1$ the receiver operates in the search mode of operation. During this time the output of NAND gate 220 and the output of switch 225 are in the logical 1 state which is represented by a voltage of +V. When both of these outputs are in the logical 1 state clock pulses are allowed to pass through AND gate 221 to the clock pulse input of counter 226 allowing counter 226 to sequentially advance count by count. This cycling produces the staircase waveform upon the output of digital/analog converter 227. Many more steps than are shown here would ordinarily be used, a relatively small number being shown here for clarity of illustration.

At time $t_1$ the signal from the designated buoy is picked up by the receiver and the output of NAND gate 220 drops to the logical 0 state. This blocks the passage of clock pulses to counter 226 halting the counter at the count then present. This causes the voltage output from digital/analog converter 227 to remain constant.

At a later time $t_2$ switch 225 is manually turned to the search position causing its output to fall to the logical 0 state. This additional logical 0 input to AND gate 221 locks clock pulses out of counter 226 should the output of NAND gate 220 return to the logical 1 state during the direction finding operation. Such a situation is illustrated between $t_3$ and $t_4$. The output of the audio signal as measured at the output of signal summer 215 falls as the null direction toward the designated buoy is reached by directional antenna 200. This causes the output of NAND gate 220 to return to the logical 1 state. Clock pulses would be allowed to pass to counter 226 were it not for the presence of the logical 0 input to AND gate 221 from the output switch 225.

After time $t_4$, when it is desired to return to the search mode of operation after the direction to the designated buoy has been determined, switch 225 is returned to the search position. Audio frequency filters 210 and 211 are readjusted to the frequencies corresponding to the next buoy. Both the output of NAND gate 220 and the output of switch 225 are then in the logical 1 state permitting counter 226 to continue cycling.

Figure 4:
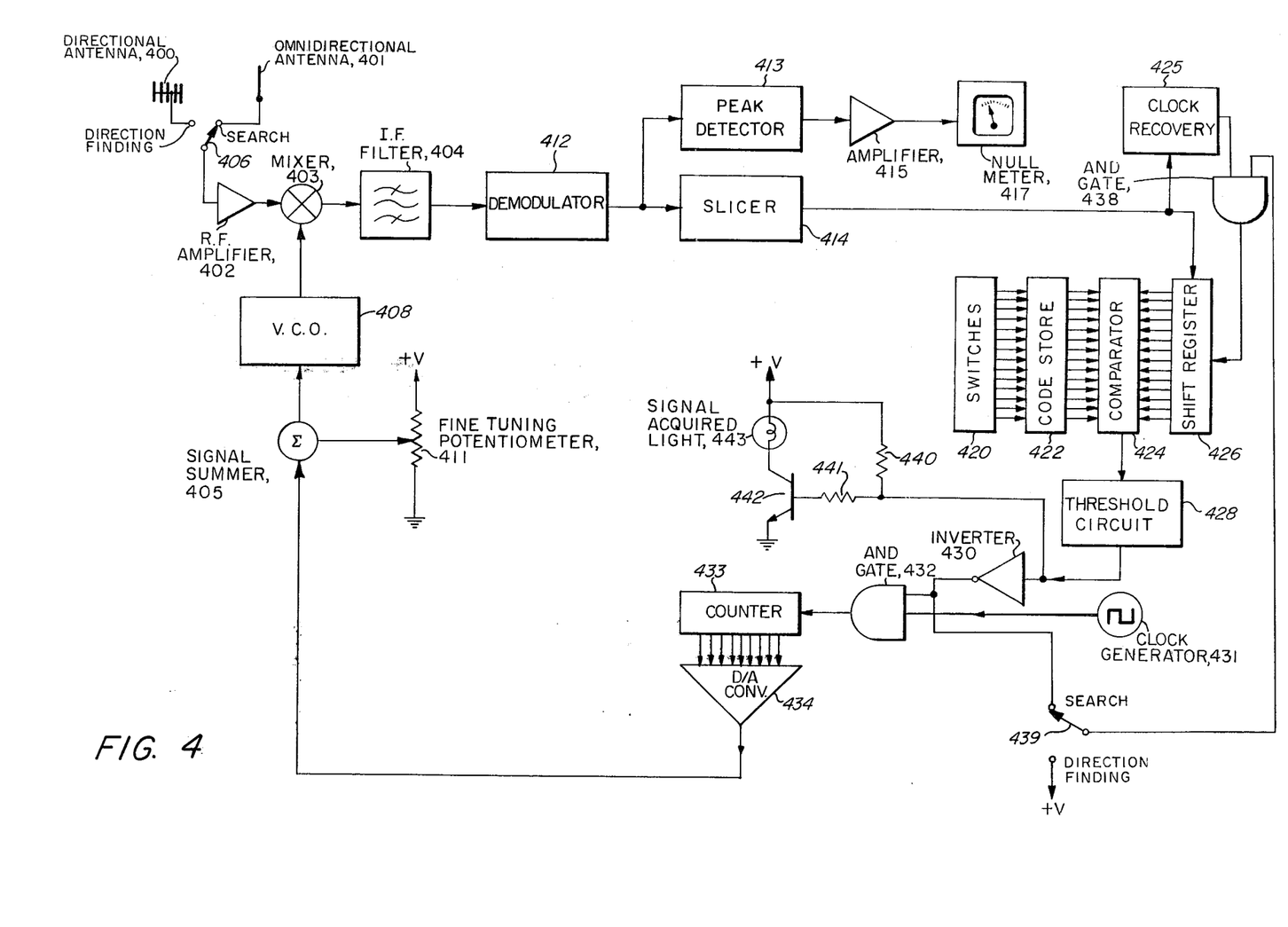
FIG. 4 is a block schematic diagram of a receiver circuit in accordance with a second embodiment of the invention.

Referring now to FIG. 4 there is shown a block schematic diagram of a receiver which is used with the second embodiment of the invention. Directional antenna 400, omnidirectional antenna 401, switch 406, RF amplifier 402, mixer 403, IF filter 404, fine tuning potentiometer 411, voltage controlled oscillator 408, signal summer 405, counter 433, digital/analog converter 434, AND gate 432, clock generator 431, detector 412 and switch 439 operate the same as the corresponding components in the receiver shown in FIG. 2. The output of detector 412 is coupled to slicer 414 which clamps the output voltage from detector 412 to voltage limits corresponding to the logical 1 and logical 0 states. The serial stream of binary numbers from slices 414 are loaded into shift register 426 one bit at a time for each clock pulse produced by clock recovery circuit 425. Clock recovery circuit is shown in further detail in FIG. 8. The code corresponding to the designated buoy is operator selected by switches 420 and loaded therefrom into code store 422. Comparator 424 makes a continuous bit by bit comparison between the number contained on the output lines of code store 422 and the parallel output lines from shift register 426. Comparator 424 produces a voltage upon its output line in proportion to the number of identical bits between corresponding output lines of code store 422 and shift register 426. Threshold circuit 428 produces a logical 0 output when the voltage output of comparator 424 is below a predetermined level. When the predetermined level is exceeded, the output of threshold circuit 428 assumes the logical 1 state. Inverter 430 changes a logical 0 to a logical 1 and a logical 1 to a logical 0 so that below the predetermined level a logical 1 will be coupled to the input of AND gates 432 and 438. Above the predetermined level a logical 0 input will be present to thereby block the flow of clock pulses from clock pulse generators 431 and 425 to the clock input of counter 433 and to the shift register 426. This stops the scanning operation as described in conjunction with the receiver circuit of FIG. 2. Scanning can be initiated by operating switch 439 or by changing the code.

When the desired signal has been found the the output of threshold circuit 428 is in the logical 1 state, current is permitted to flow through resistors 440 and 441 turning on transistor 442 and signal acquired light 443. With no such signal present, a logical 0 output from threshold circuit 428 shuts off the current flow into the base of transistor 442 thereby also shutting off signal acquired light 443.

In the direction finding mode of operation, a null meter 417 produces an indication of when the preferred axis of directional antenna 400 is perpendicular to the direction at which the designated buoy lies. Peak detector 413 produces a voltage in proportion to the maximum amplitude of signals upon the output of detector 412. This voltage is amplified by amplifier 415 to a level sufficient for driving null meter 417 which may be of either the current or voltage type.

Figure 8:
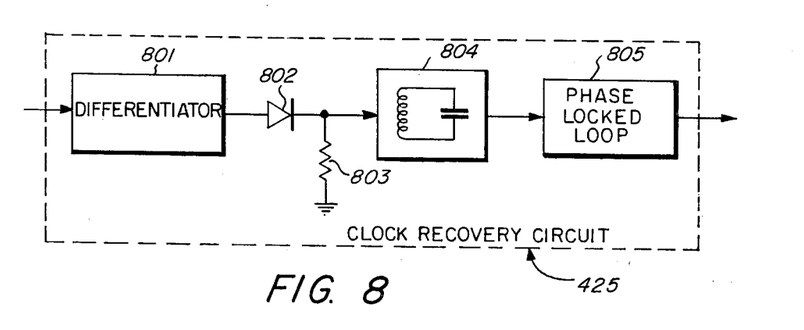
FIG. 8 is a block schematic diagram of a portion of the circuit of FIG. 4.

In FIG. 8 is shown a block schematic diagram of clock recovery circuit 425 as shown in FIG. 4. Each transition between logic states produces a pulse for transitions from logical 0 to logical 1 and a negative pulse from logical 1 to logical 0. The positive pulses are passed through diode 802 biased through resistor 803. These pulses cause oscillations to occur at the resonant frequency of tank circuit 804 which is also the frequency of the transmitted data. Phased locked loop 805 converts the variable amplitude sine wave output from tank circuit 804 to a square wave output of constant amplitude suitable for driving logic circuits.

This completes the description of the preferred embodiments of the invention. Although preferred embodiments of the invention have been described, numerous alterations and modifications thereto would be apparent to one skilled in the art without departing from the spirit and scope of the invention.

What is claimed is:

1. A receiver for use in a radio navigation system comprising in combination:
   antenna means;
   means for mixing signals received by said antenna means with a local oscillator signal;
   a voltage controlled oscillator for producing said local oscillator signal;
   means for demodulating output signals from said mixing means;
   means for simultaneously detecting the presence of a plurality of modulation components in received signals at an output of said demodulating means, each of said modulation components being of a different frequency;
   a source of clock pulses;
   means for gating said clock pulses ON when the presence of said received signals has not been detected and OFF when the presence of said received signals has been detected;
   means for producing a cyclical binary count in response to the gated clock pulses;
   means for converting the count output of said binary counter to an analog signal, said analog signal forming a control voltage input to said voltage controlled oscillator;
   means for indicating the presence of said received signals; and
   means for determining the direction to the source of said received signals;
   said indicating means and said direction determining means operating independently of the phase of said received signals.

2. The combination of claim 1 wherein said detecting means comprises:
   one or more tunable filters; and
   mean for producing a voltage indicative of the presence of signals on the outputs of said filters.

3. The combination of claim 2 further comprising:
   means for inhibiting said clock pulses in response to said voltage.

4. The combination of claim 1 wherein said detecting means comprises:
   means for storing a digital number;
   means for comparing said digital number with outputs from said demodulating means; and
   means for producing a voltage in response to the degree of comparison between said digital number and said outputs from said demodulating means.

5. The combination of claim 4 further comprising:
   means for inhibiting said clock pulses in response to said voltage.

6. The combination of claim 1 wherein said direction determining means comprises:
   directional antenna means; and
   means for indicating the amplitude of said received signals.

7. A receiver system for use in navigating a vessel such as through a harbor channel with buoys marking passage through the channel with each of the buoys emitting a radio frequency signal capable of identifying the buoy from which the signal is emitted comprising:
   a directional antenna;
   an omnidirectional antenna;
   a radio frequency signal amplifier;
   switch means for selectively coupling one of the directional antenna or omnidirectional antennas to the radio frequency signal amplifier;
   a signal mixer, the output of the radio frequency signal amplifier being coupled to an input of the mixer;
   an intermediate frequency filter coupled to the output of the mixer;
   a demodulator coupled to the output of the intermediate frequency filter;
   means for detecting the presence of predetermined modulation components for identifying the buoy from which the received signals were emitted;
   a digital counter;
   a source of clock signal for operating the digital counter, the clock signal being inhibited to the digital counter in response to the detecting means;
   a digital-to-analog converter coupled to the outputs of the digital counter; and
   a voltage controlled oscillator, the output of the voltage controlled oscillator being derived in accordance with the output of the digital-to-analog converter and coupled to an input of the mixer.

8. The receiver system of claim 7 wherein the means for detecting the presence of predetermined modulation components comprises:
- at least two audio frequency filters;
- an audio frequency detector coupled to the output of each of the audio frequency detectors; and
- a gating circuit for gating off the clock signal to the digital counter in response to output signals from the audio frequency detectors.

9. The receiver system of claim 7 wherein the means for detecting the presence of predetermined modulation components comprises:
- means coupled to the demodulator for storing a received digital code;
- switch means for permitting an operator to enter a selected code;
- a comparator for comparing the bits of the received digital code with the bits of the operator entered code, the comparator producing an output voltage in proportion to the number of bits in the compared codes which are identical;
- a threshold detecting circuit, the output of the comparator being coupled to the input of the threshold detecting circuit; and
- a gating circuit for gating the clock signal to the counter in response to the output of the threshold detecting circuit.

10. The receiver system of claim 8 further comprising:
- a null meter operating in response to the output signal level from the demodulator.

* * * * *

UNITED STATES PATENT OFFICE
CERTIFICATE OF CORRECTION

Patent No. 4,071,845          Dated Jan. 31, 1978

Inventor(s) Fritz A. Gross

It is certified that error appears in the above-identified patent and that said Letters Patent are hereby corrected as shown below:

Column 1, line 31:  change "not" to - now - ;

Column 2, line 26:  change "dinatey" to - dinately - ;

Column 5, line  6:  change "direction" to - invention - ;

Column 5, line 13:  change "$f_o$" to - $f_c$, - ;

Column 9, line 11:  after found change "the the" to - and the -

Signed and Sealed this

Sixth Day of June 1978

[SEAL]

Attest:

RUTH C. MASON
Attesting Officer

DONALD W. BANNER
Commissioner of Patents and Trademarks